United States Patent [19]

Chips

[11] Patent Number: 4,895,085
[45] Date of Patent: Jan. 23, 1990

[54] METHOD AND STRUCTURE FOR IN-SITU REMOVAL OF CONTAMINATION FROM SOILS AND WATER

[76] Inventor: Mark D. Chips, 980 Kiely Blvd., Apt. #303, Santa Clara, Calif. 95051

[21] Appl. No.: 142,726

[22] Filed: Jan. 11, 1988

[51] Int. Cl.[4] .............................................. F23G 5/00
[52] U.S. Cl. ...................................... 110/346; 110/236; 241/DIG. 10; 431/202
[58] Field of Search ................................ 110/341, 236; 241/DIG. 10; 431/202

[56] References Cited

U.S. PATENT DOCUMENTS

| | | |
|---|---|---|
| 2,928,247 | 3/1960 | Hubbell . |
| 3,354,656 | 11/1967 | Fahnestock . |
| 3,383,863 | 5/1968 | Berry . |
| 3,586,624 | 6/1971 | Larson . |
| 3,599,433 | 8/1971 | Yalzu et al. . |
| 3,696,622 | 10/1972 | Tohma et al. . |
| 3,837,785 | 9/1974 | Evans et al. ................ 431/202 X |
| 3,908,387 | 9/1975 | Nakamura . |
| 4,043,830 | 8/1977 | Suzuki . |
| 4,056,937 | 11/1977 | Suzuki . |
| 4,308,006 | 12/1981 | Koblanski ................ 431/202 X |
| 4,336,136 | 6/1982 | Giguere . |
| 4,431,402 | 2/1984 | Hamilton ................ 431/202 X |
| 4,435,292 | 3/1984 | Kirk et al. . |
| 4,465,402 | 8/1984 | ter Meulen . |
| 4,518,350 | 5/1985 | Mueller et al. . |
| 4,576,572 | 3/1986 | Mueller et al. . |
| 4,593,760 | 6/1986 | Visser . |
| 4,611,950 | 9/1986 | Russomano . |
| 4,648,332 | 3/1987 | Goedhart . |
| 4,660,639 | 4/1987 | Visser . |
| 4,667,609 | 5/1987 | Hardison et al. ................ 110/236 |
| 4,700,638 | 10/1987 | Przewalski ................ 110/236 X |
| 4,730,672 | 3/1988 | Payne . |
| 4,846,134 | 7/1989 | Perry et al. . |

Primary Examiner—Edward G. Favors
Attorney, Agent, or Firm—Steven F. Caserza

[57] ABSTRACT

A method and structure is provided whereby contaminated soil is decontaminated in situ by the extraction of vapor from the soil and subsequent destruction of the contaminants contained in the interstitial fluid of the soil by processing the fluid through an internal combustion engine or other suitable combustion means. To achieve this purpose, the invention is provided with a means of conducting the fluid from the soil to a manifold system.

17 Claims, 2 Drawing Sheets

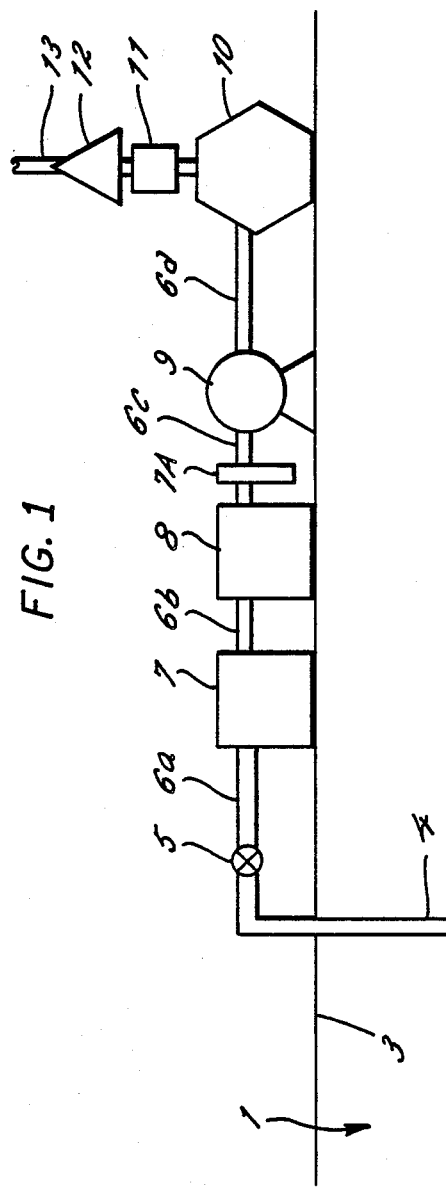
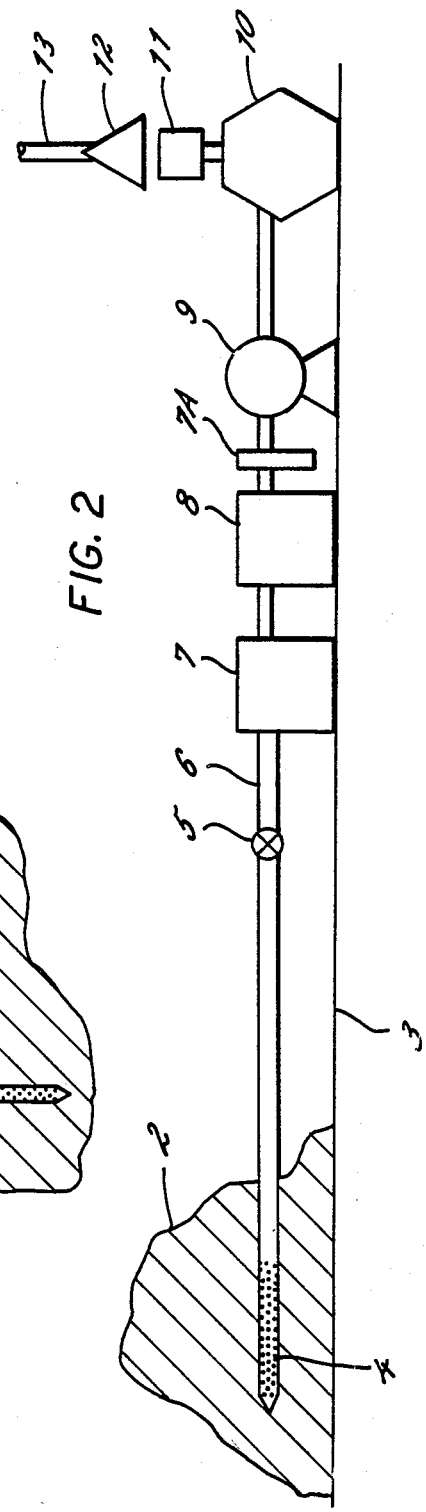

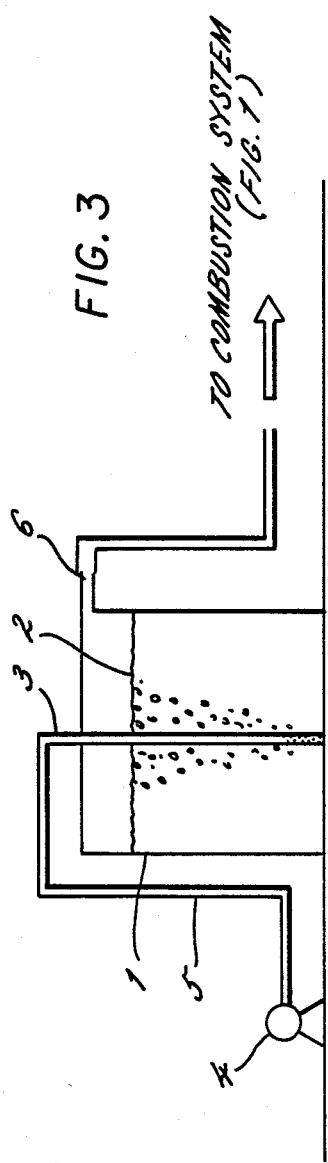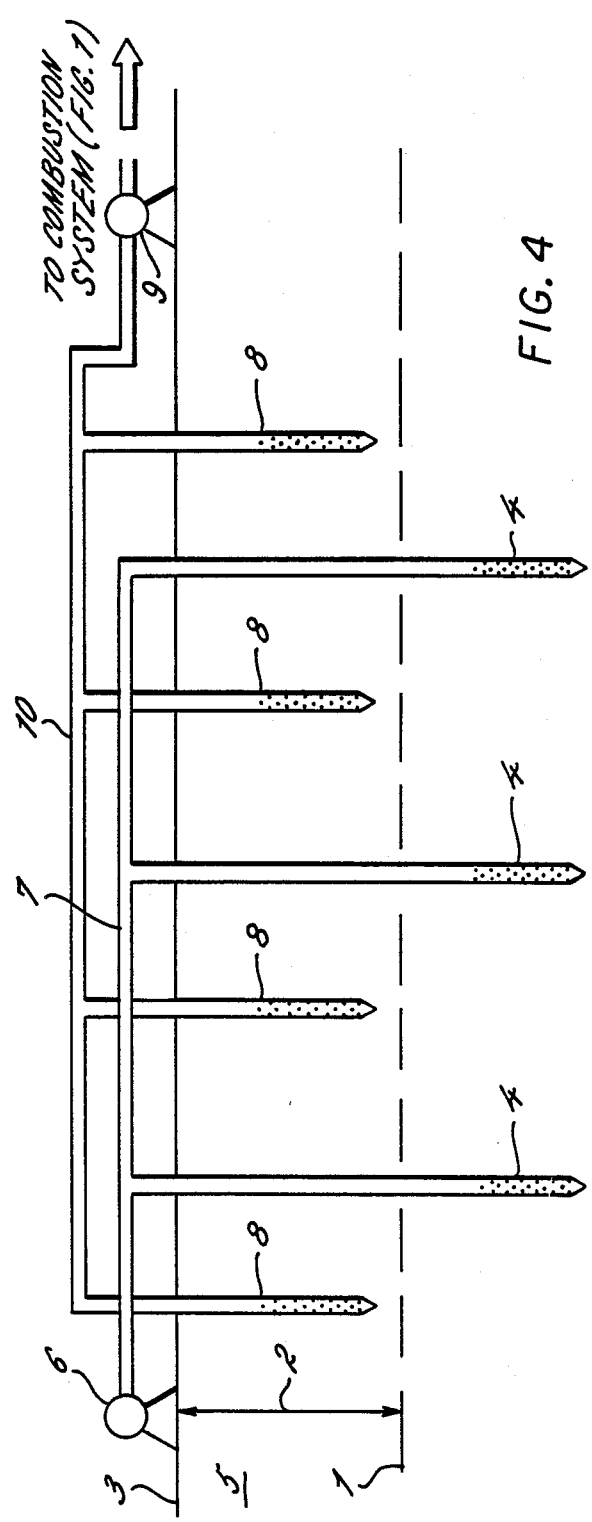

METHOD AND STRUCTURE FOR IN-SITU REMOVAL OF CONTAMINATION FROM SOILS AND WATER

BACKGROUND OF THE INVENTION

The present invention is generally related to a process for removing contamination from soil and water, and is more particularly concerned with a device adapted to operate as fume incinerator, the fumes being derived from the contaminated soil and/or water.

At the present time, the general method for removing contamination from soil is the excavation of the soil with subsequent transport to a waste disposal facility. This excavation is often very detrimental to the site, and the excavation, transport, and final disposal of the contaminated soil is almost invariably very costly to the property owner. More importantly, this type of treatment merely moves the contamination from one particular site to another. The site to which the contamination is moved must be specially prepared in order to contain the contamination.

An alternative technique for removing contamination from soil is to excavate the soil and allow contamination to be evaporated into the atmosphere, with the contaminated earth being spread into a relatively thin layer over a fairly large area. However, this technique has a disadvantage of requiring excavation, requiring a rather large area over which to spread the contaminated soil, contaminating the air by removing the contamination from the soil and placing it in the air, and the potential for contaminating soil upon which the contaminated soil is spread.

A number of even more complex techniques are known, including essentially "burning" contaminants out of excavated soil, as shown in U.S. Pat. Nos. 4,648,332; 4,518,350; 4,336,136; and 4,576,572. However, such prior art techniques require excavation and a rather large piece of equipment to "burn" the contaminants from the soil. Other prior techniques do not remove contaminants from the soil, but merely contain them within the soil, inserting stabilizing material, such as grout, into the soil to contain a contamination problem, as shown in U.S. Pat. Nos. 3,908,387; 3,599,433; 4,056,937; 4,043,830; 3,383,863; 3,354,656. Still other prior art techniques use wells to remove the contaminants from the soil, either using water or air as a carrying medium, and require costly processing of the extracted contaminants in order to cleanse the carrying medium. This is shown in U.S. Pat. Nos. 4,611,590; 4,465,402; 3,586,624; 3,696,622; 2,928,247; and 4,435,292. For example when withdrawing water from contaminated soil in order to draw contaminants from the soil, the water is contaminated and must be purified to a high degree. The same is true if air is used as the carrying medium, with air being removed from the ground being contaminated, and required to be purified to a high degree in order to remove the contaminants prior to releasing the air back to the atmosphere.

SUMMARY

In accordance with the teachings of this invention, a method and structure is provided whereby contaminated soil is decontaminated in situ by the extraction of vapor from the soil. In general, most soils contain considerable quantities of interstitial fluid (typically air or water) that is located between adjacent soil particles. The spaces between these particles are the usual cause of the porosity of a soil. The interstitial fluid around these soil particles is free to move by pressure gradients, diffusion, or pneumatic means. The induced movement of this interstitial fluid for subsequent removal has a general cleansing effect on the soil by evaporation means. The contamination (especially if volatile) is carried with the interstitial fluid to the evacuation zone surrounding fluid extraction probes inserted into the soil, and thereby extracted from the soil.

In one embodiment of this invention, a system is provided that removes contaminated fluid from the soil and destroys the contaminants contained in the fluid by processing the fluid through an internal combustion engine or other suitable combustion means. To achieve this purpose, the invention is provided with a means of conducting the fluid from the soil to a manifold system. In one embodiment, the contaminated soil vapors are transported to the combustion means through a filter arrangement and liquid water knockout trap.

BRIEF DESCRIPTION OF THE DRAWING

FIG. 1 depicts one embodiment of a structure and method used in accordance with the teachings of this invention to remove contamination from subterranean soil;

FIG. 2 depicts on embodiment of the method and structure of this invention for removing contamination from a pile of soil located above ground;

FIG. 3 depicts the removal of contamination from water in accordance with the teachings of this invention; and FIG. 4 depicts another embodiment of this invention for use in removing contamination from contaminated groundwater.

DETAILED DESCRIPTION

Referring to the drawing shown in FIG. 1, the soil 1 can include, but is not limited to, native soil, in-situ or excavated soil, fill material, soil, sand, silt, rock, mud, clay, gravel, or loam. The zone of contamination 2 is penetrated from ground surface 3 by one or more vapor extraction probes 4. Piping 6a connects flow control valve 5 to the inlet of filter 7, and the outlet of filter 7 is connected via piping 6b to the inlet of liquid water knockout trap 8. Additional piping 6c is used to connect air movement device 9, which in turn has its outlet connected to the intake manifold of combustion device 10. If desired, muffler 11 is used on the exhaust of combustion device 10, and if desired scrubber or catalytic converter 12 and stack exhaust means 13 are also advantageously employed.

FIG. 2 shows one embodiment of this invention shown in use removing contamination from an excavated soil pile.

FIG. 3 shows another embodiment of this invention shown in use removing contamination from a tank or pond of contaminated water. Referring to FIG. 3, tank 1 holds the contaminated water 2. Probe 3 is used advantageously to inject clean air from pump 4 through piping 5 into contaminated water 2, it picks up contamination and ultimately exits tank 1 through vent 6. Vent 6 is connected to the main combustion device 10 through manifold 6A, as shown in FIG. 1. The cleansing effect caused by the clean air passing through the water ultimately renders the water clean and fit for re-use or non-hazardous disposal.

FIG. 4 shows a further embodiment of this invention shown in use removing contamination from contaminated groundwater. Referring to FIG. 4, contaminated groundwater 1 lies at a depth 2 below the surface 3. A series of probes 4 are inserted through soil 5 into the groundwater aquifer 1. Clean air from pump 6 is passed through manifold piping 7 and injected into aquifer 1 by pneumatic means through probes 4. The clean air passes through aquifer 1 and picks up portions of the contamination contained therein. The injected air then travels to the vapor extraction probes 8 by the pressure/vacuum gradient imposed by applied pneumatic pump means 6 and 9. Pump 9 draws the contaminated vapors through manifold 10 which delivers the vapors to the combustion system manifold 6A, as shown in FIG. 1.

As shown in FIG. 1, one embodiment of this invention utilizes several basic components: One or more Vapor Extraction Probes 4, Manifold System 6, Filter 7, Water Trap 8, Air Movement Device 9, Combustion Device 10, Muffler 11, and Scrubber or Catalytic Converter 12.

Vapor extraction probes 4 are the means whereby the interstitial soil vapor is removed from the contaminated soil. Vapor extaction probes may be installed in any convenient manner, such as by drilling, driving, or pushing the probes into the soil. A probe is typically formed of metal or plastic pipe, tubing, hose, or ducting that has perforations along its length. Preferably, the perforations are located at the bottom few feet of the probe so that air from the surface must pass through a maximum distance of soil, thereby obtaining as great an amount of contaminants as possible.

Manifold system 6 is formed by the collective plumbing of the system. The manifold system is conveniently constructed of pipe, tubing, or hose which is composed of metal, plastic, or rubber, or some combination thereof.

Manifold system 6 can also include valves and flow meters for flow control and flow measurement, respectively. The purpose of manifold system 6 is to connect vapor extraction probes 4 to combustion device 10. Also, if desired, manifold system 6 is used to add ambient air, oxygen, or other desired components to the extracted vapor for the purpose of adjusting the concentration of contaminants provided to combustion device 10, to insure proper functioning of combustion device 10 and preferably low exhaust pollution from combustion device 10. Suitable valves (for example, electrically or pneumatically actuated) may be used to adjust flows. Alternatively, manually actuated valves are used for this purpose.

Manifold system 6 can also advantageously include numerous test points that are used for analytical samples. These test points offer the means of withdrawing a sample of extracted vapor from manifold 6 for the purpose of determining the concentration of the contaminant vapor in the fluid stream. This is accomplished by the connection of the sample point to the appropriate analyzer device, including but not limited to a Hydrocarbon Analyzer.

If desired, flame arrestors (such as stainless steel wool sections) are placed at strategic places in the manifold in order to minimize danger of fire, flashback, or explosion of the contaminated vapor which is being combusted following its removal from the soil.

The vapor that is removed from the soil is generally saturated with water. Also, a lysimeter effect occurs where liquid water is drawn into the probes. This liquid will travel with the vapor and unless removed may cause problems further along in the system, particularly depending on the type of combustion device used.

Therefore water knockout trap 8 is placed in line to remove any entrained water from the vapor. Preferably, water knockout trap 8 is equipped with an automatic rejection system that actuates in response to a timer or sensor/pump controller. The removed water (which may itself contain contaminants) is then, for example, pumped into an evaporation pan or into storage drums for future disposal.

Along with water, the contaminated vapor may carry particulate material from the soil, such as clay silt, sand, gravel, and rocks. This material will likely cause serious detrimental effects to air movement device 9 and combustion device 10. Thus, filter 7 is used, preferably having a front filter which operates in wet conditions and has a relatively large pore size, and a back filter 7A which operates under relatively dry conditions (after water trap 8) and has a smaller pore size.

Additionally, if desired, as a final precaution, a final filter (not shown, but such as a typical automotive fuel filter) filters the vapor to be combusted prior to entry to the inlet of combustion device 10.

The air movement device is an air pump or fan that serves as a vacuum source to manifold system 6 and thus to the vapor probes 4 in order to cause vapor to flow from the soil, into vapor extraction probes 4, through the manifold system 6 and related components, and to combustion device 10. The air movement device may consist of a straight or sentinal case type fan or blower, or carbon or composite vane pump. Any other style of fan or pump is also suitable. The air movement device may, if desired, be connected to combustion device 10 for motive power, thereby minimizing power requirements.

In one embodiment, air movement device 9 may be combustion device 10 itself, for example when an internal combustion engine is used as combustion device 10. A typical gasoline piston engine has roughly 20 inches of mercury vacuum on the engine inlet manifold, which is available to manifold system 6.

Combustion device 10 can be any suitable device for burning the contaminants contained in the vapor extracted from the soil. Internal combustion engines such as piston engines, aircraft engines, jet engines, turbine engines, rotary engines, wankel engines, diesel, propane, natural gas, and alcohol burning engines, two and four cycle engines are suitable. For example, a piston type V-8 gasoline engine is used in one embodiment, although many other types of engines can be used to good effect. The non-obvious benefit of using internal combustion engines is that high temperatures and pressures are available simultaneously to afford a more rapid and complete combustion of the contaminants.

The concentration of the vapor that is removed from the soil vary from site to site, and also vary over time. Generally, the highest vapor concentrations are encountered at the very beginning of the vapor extraction process. The concentration usually follows a hyperbolic decay over time.

The initial concentration of vapor may be greater than the combustion device can handle while functioning properly. When this occurs, ambient air (or other suitable component) is used to dilute the contaminant concentration of the vapor stream so that efficient combustion is sustained. As the vapor concentration decreases (i.e., the soil becomes less contaminated), the dilution air is adjusted so as to maintain proper combustion. When the vapor concentration becomes too dilute for sustained combustion, supplemental fuel is added, for example via the carburetor when a gasoline engine is used as the combustion device.

These flow adjustments may be done manually or by use of timers, or by use of an oxygen sensor at the engine exhaust and a feedback system to the valves. A manual valve system may be used to good effect where a person is available to adjust the valves to maintain efficient operation of combustion device 10. Alternatively, an automatic valve adjustment system is used to allow combustion device 10 to run unattended for longer periods of time. This automatic valve adjustment is accomplished by use of appropriately sized electrically or pneumatically operated valves which open or close in small increments. The actual operation of these valves is triggered by a sensing device placed in vapor manifold 6 or exhaust stack 13. The sensor detects hydrocarbons or oxygen in vapor manifold 6 or exhaust stack 13, respectively, and adjusts the valves appropriately to maintain efficient operation of combustion device 10.

Preferably a muffler is used on the combustion device exhaust to ensure quiet operation, particularly when an internal combustion engine is used. Similarly, a catalytic converter may be used to limit nitrogen oxide or hydrocarbon emissions. Also, when halogenated hydrocarbons are being processed, halogen acids (i.e., HCL, HF, HBr) are preferably removed from the exhaust, for example by using a caustic scrubber or carbonate bed.

The soil and water cleansing system and method of this invention is suitable for use when soil and/or water is contaminated with one or more vapor-producing substances including but not limited to gasoline, diesel fuel, kerosene, benzene, toluene, xylene, petroleum distillates, hydrocarbons; alcohols including but not limited to methanol, ethanol, isopropanol; halogenated hydrocarbons and halocarbons including but not limited to methylene chloride, trichloroethylene, trichloroethane, perchloroethylene, perchloroethane, chloroform, carbon tetrachloride, dichloroethylene, dichloroethane, chloroethylene, chloroethane; Freons including but not limited to Freon 12 and Freon TF; ethers including but not limited to diethyl ether and chlorinated ethers; ketones including but not limited to acetone, methylethyl ketone, methyl isobutyl ketone; paraffinic hydrocarbons including but limited to methane, ethane, propane, butane, pentane, hexane, cyclocompounds; unsaturated hydrocarbons including but not limited to ethylene, propylene, acetylene, methyl acetylene, allene; nitrohydrocarbons including but not limited to nitromethane, nitroethane, nitropropane, nitrobutane, nitrobenzene; hydrazines including but not limited to hydrazine, hydrazine hydrate, methyl hydrazine, unsymmetrical dimethyl hydrazine, symmetrical dimethyl hydrazine, ethyl hydrazine; aldehydes including but not limited to methanal, ethanal, propanal and acrolein.

All publications and patent applications are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from the spirit or scope of the appended claims.

What is claimed is:

1. A structure for the in situ removal of contamination from soil or water comprising:
   means for extracting contaminated vapor from said soil or water while said soil or water remain in situ; and
   an internal combustion engine for causing destruction of said vapor.

2. A structure as in claim 1 which further comprises means for removing water from said vapor prior to delivery to said internal combustion engine.

3. A structure as in claim 1 which further comprises means for filtering said vapor prior to delivery to said internal combustion engine.

4. A structure as in claim 1 which further comprises flow control means for regulating the flow of said vapor to said internal combustion engine.

5. A structure as in claim 1 which further comprises means for causing vapor movements from said means for extraction to said internal combustion engine.

6. A structure as in claim 1 which further comprises means for introducing additional components into the vapor stream prior to delivery to said internal combustion engine.

7. A structure as in claim 6 wherein said additional components comprise air and/or oxygen, thereby diluting the contaminant concentration in said vapor stream.

8. A structure as in claim 6 wherein said additional components comprise fuel, thereby increasing the concentration of combustibles in said vapor stream.

9. A structure as in claim 5 wherein said means for causing vapor movement is powered by said internal combustion engine.

10. A structure as in claim 1 wherein said contaminated soil is contaminated with one or more vapor-producing substances including but not limited to gasoline, diesel fuel, kerosene, benzene, toluene, xylene, petroleum distillates, hydrocarbons; alcohols including but not limited to methanol, ethanol, isopropanol; halogenated hydrocarbons and halocarbons including but not limited to methylene chloride, trichloroethylene, trichloroethane, perchloroethylene, perchloroethane, chloroform, carbon tetrachloride, dichloroethylene, dichloroethane, chloroethylene, chloroethane; Freons including but not limited to Freon 112 and Freon TF; ethers including but not limited to diethyl ether and chlorinated ethers; ketones including aretone, methylethyl ketone, methyl isobutyl ketone; paraffinic hydrocarbons including but not limited to methane, ethane, propane, butane, pentane, hexane; cyclocompounds; unsaturated hydrocarbons including but not limited to ethylene, propylene, acetylene, methyl acetylene, allene; nitrohydrocarbons including but not limited to nitromethane, nitropropane, nitrobutane, nitrobenzene; hydrazines including but not limited to hydrazine, hydrazine hydrate, methyl hydrazine, unsymmetrical dimethyl hydrazine, symmetrical dimethyl hydrazine, ethyl hydrazine; aldehydes including but not limited to methanal, ethanal, propanal and acrolein.

11. A structure as in claim 1 wherein said internal combustion engine is selected from the group of piston engines, aircraft engines, jet engines, turbine engines, rotary engines, wankel engines, diesel, propane, natural gas, and alcohol burning engines, two and four cycle engines.

12. A method for the in situ removal of contaminants from contaminated soil comprising the steps of:
   extracting vapor of said contaminants from said soil while said soil remain in situ; and feeding said extracted vapor to an internal combustion engine, thereby destroying said contaminants.

13. A method as in claim 12 further comprising the step of removing water from said vapor prior to said step of feeding.

14. A method as in claim 12 which further comprises the step of controlling the flow of said vapor prior to said step of feeding.

15. A method as in claim 12 further comprising the step of introducing additional components to said vapor prior to said step of feeding.

16. The method as in claim 15 wherein said additional components comprise air and/or oxygen.

17. A method as in claim 15 wherein said additional components comprise fuel.

* * * * *